United States Patent
Müller

(10) Patent No.: US 12,163,819 B2
(45) Date of Patent: Dec. 10, 2024

(54) MEASURING DEVICE FOR DETERMINING THE FLOW OF A FLUID FLOWING THROUGH A PIPE SECTION

(71) Applicant: Sensus Spectrum LLC, Morrisville, NC (US)

(72) Inventor: Frank Müller, Ronnenberg (DE)

(73) Assignee: Sensus Spectrum, Morrisville, NC (US)

( * ) Notice: Subject to any disclaimer, the term of this patent is extended or adjusted under 35 U.S.C. 154(b) by 286 days.

(21) Appl. No.: 17/597,977

(22) PCT Filed: Jul. 29, 2020

(86) PCT No.: PCT/EP2020/071368
§ 371 (c)(1),
(2) Date: Jan. 31, 2022

(87) PCT Pub. No.: WO2021/028222
PCT Pub. Date: Feb. 18, 2021

(65) Prior Publication Data
US 2022/0316932 A1  Oct. 6, 2022

(30) Foreign Application Priority Data

Aug. 9, 2019  (DE) .......................... 102019121542.0

(51) Int. Cl.
*G01F 15/18* (2006.01)
*G01F 1/66* (2022.01)
*G01F 1/667* (2022.01)

(52) U.S. Cl.
CPC ............ *G01F 15/185* (2013.01); *G01F 1/667* (2013.01)

(58) Field of Classification Search
CPC ........ G01F 15/185; G01F 1/667; G01F 1/662; G01F 1/66; G01F 5/00; G01F 1/7082; G01F 23/2961; G01F 15/18; G01F 1/3209; G01D 5/48; G10K 11/24; G01N 29/2487; G01N 29/221; G01P 5/241; G01L 11/06
See application file for complete search history.

(56) References Cited

U.S. PATENT DOCUMENTS

| | | | |
|---|---|---|---|
| 2018/0328768 A1* | 11/2018 | Huijzer | G01F 1/662 |
| 2019/0072421 A1 | 3/2019 | Drachmann | |
| 2019/0154481 A1 | 5/2019 | Price | |
| 2019/0226893 A1 | 7/2019 | Kuhlemann et al. | |

FOREIGN PATENT DOCUMENTS

| | | | | |
|---|---|---|---|---|
| DE | 102012101098 | | 8/2013 | |
| DE | 102016208297 A1 * | 11/2016 | | G01F 1/662 |
| DE | 102018126613 A1 * | 4/2020 | | G01F 1/662 |
| EP | 3217152 A1 * | 9/2017 | | G01F 1/66 |
| WO | WO2016012024 | | 1/2016 | |

* cited by examiner

*Primary Examiner* — Brandi N Hopkins
(74) *Attorney, Agent, or Firm* — McHale & Slavin, P.A.

(57) ABSTRACT

A measuring device for determining the flow of a fluid flowing through a pipe section. The measuring device may comprise a measuring pipe arrangement with a pipe, at least one ultrasonic sensor for transmitting an acoustic signal, at least one ultrasonic receiver for receiving the acoustic signal emitted by the ultrasonic sensor, a reflection element for reflecting the acoustic signal, wherein the wall of the pipe has a through-opening, which is covered by the reflection element, wherein the reflection element is fastened in interlocking fashion to the wall of the pipe.

10 Claims, 3 Drawing Sheets

MEASURING DEVICE FOR DETERMINING THE FLOW OF A FLUID FLOWING THROUGH A PIPE SECTION

CROSS REFERENCE TO RELATED APPLICATIONS

This is a national stage filing in accordance with 35 U.S.C. § 371 of PCT/EP2020/071368, filed Jul. 29, 2020, which claims the benefit of the priority of German Patent Application No. 102019121542.0, filed Aug. 9, 2019, the contents of each are incorporated herein by reference.

TECHNICAL FIELD

The present invention relates to a measuring device for determining the flow rate of a fluid which flows through a pipe portion. In particular, the present invention relates to a measuring device for determining the flow rate of the fluid which flows through a pipe portion by means of ultrasonic sensors according to the time of flight difference method.

State of the Art

When determining the flow rate of a fluid which flows through a pipe portion by means of ultrasonic sensors using the time of flight difference method, acoustic signals are coupled into the fluid by means of an ultrasonic sensor. An ultrasonic receiver receives the signal at the end of the predetermined path of the signal. The flow rate of a fluid which flows through the measuring pipe can be determined from the measured transit time of the signal compared to a measured transit time of a signal in a state in which the fluid in the measuring pipe is not flowing, if the measuring pipe geometry is known.

In order to extend the travel path of the signal or for structural reasons, reflection points are provided between the ultrasonic sensor and the ultrasonic receiver, at which the coupled signal is reflected so that the coupled signal travels along a V-shaped or W-shaped path, for example. These reflection points can be formed by the measuring pipe itself.

In many cases, measuring pipes are provided with a powder coating to protect metals from corrosion. As a result, the ultrasonic signal reflected from the powder-coated pipe wall is weaker than the ultrasonic signal reflected from a smooth measuring wall. This in turn results in the measurement result having a higher inaccuracy when using a powder-coated measuring pipe compared to measuring pipes with a smooth metal surface.

For this reason, reflection elements are provided which are designed as separate components and are located inside the measuring pipe.

In this context, the question arises how to fix the reflection element in the measuring pipe.

On the one hand, the reflection element must be held securely in the measuring pipe so that it is not carried away with the fluid flowing through the measuring pipe. On the other hand, the reflection element should not influence the flow, in particular the flow velocity of the fluid flowing through the measuring pipe. Furthermore, the reflection element must not lead to any undesirable vortex formation or turbulent flow in the measuring pipe.

DE 10 2012 101 098 A1 shows, for example, that the reflection element, which is formed as a separate component, can be welded, soldered or glued to the measuring pipe. However, these are relatively complex joining processes.

WO 2016/012024 A1 describes an insert in a measuring pipe in which an additional fixing element is provided to hold a reflection element securely on the inner wall of the measuring pipe.

DESCRIPTION OF THE INVENTION

It is the object of the present invention to provide a flowmeter with a measuring pipe arrangement in which the reflection element is attached to the measuring pipe in a simple and secure manner and without an additional fixing element.

According to the invention, the object is solved by a measuring device for determining the flow rate of a fluid which flows through a pipe portion, comprising a measuring pipe arrangement with a pipe, at least one ultrasonic sensor for emitting an acoustic signal, at least one ultrasonic sensor for receiving the acoustic signal emitted by the ultrasonic sensor, a reflection element for reflecting the acoustic signal, wherein the wall of the pipe has a through-opening which is covered by the reflection element, with the reflection element being fastened to the wall of the pipe in a positive-locking manner.

The form fit fastening of the reflection element to the pipe wall on the one hand enables the reflection element to be held securely on the inner pipe and comparatively simple assembly on the other. Assembly is particularly simple if, according to a preferred embodiment, the reflection element is fastened to the outside of the pipe.

Preferably, there is a snap-in connection between the reflection element and the wall of the pipe.

It is further advantageous that the reflection element is aligned flush with the inner wall of the pipe, at least in the longitudinal direction of the pipe, in order to avoid disturbing influences of the reflection element on the fluid which flows through the measuring pipe, in particular to prevent an influence on the flow rate of the fluid through the measuring pipe as well as vortex formations in the interior of the measuring pipe.

In a preferred embodiment, the reflection element has a flat plate that serves as a reflecting surface for the ultrasonic signal.

Preferably, fastening elements, in particular fixing eyelets and/or flat tabs, are provided for fastening the reflection element to the pipe.

Here, it is advantageous that the pipe has counter fastening elements such as latching lugs.

In order to compensate for component tolerances of the reflection element, the latching lug preferably has compensating surfaces.

In a preferred embodiment, the pipe is an inner pipe of the measuring pipe arrangement.

It is further advantageous that the inner pipe has at least one straight wall section which preferably extends in the axial direction and/or in the circumferential direction. This facilitates the installation of both the ultrasonic sensor and the reflection element when the ultrasonic sensor and/or the reflection element are being fastened to the measuring pipe at the straight wall section.

In order to provide both a flat installation surface for the ultrasonic sensors and/or the reflection element and not to influence the flow in the measuring pipe, in a preferred embodiment it is provided that the pipe has at least one rib-shaped bulge in the axial direction.

BRIEF DESCRIPTION OF THE DRAWINGS

Preferred embodiments are explained with reference to the accompanying drawings, in which.

Figure 1:
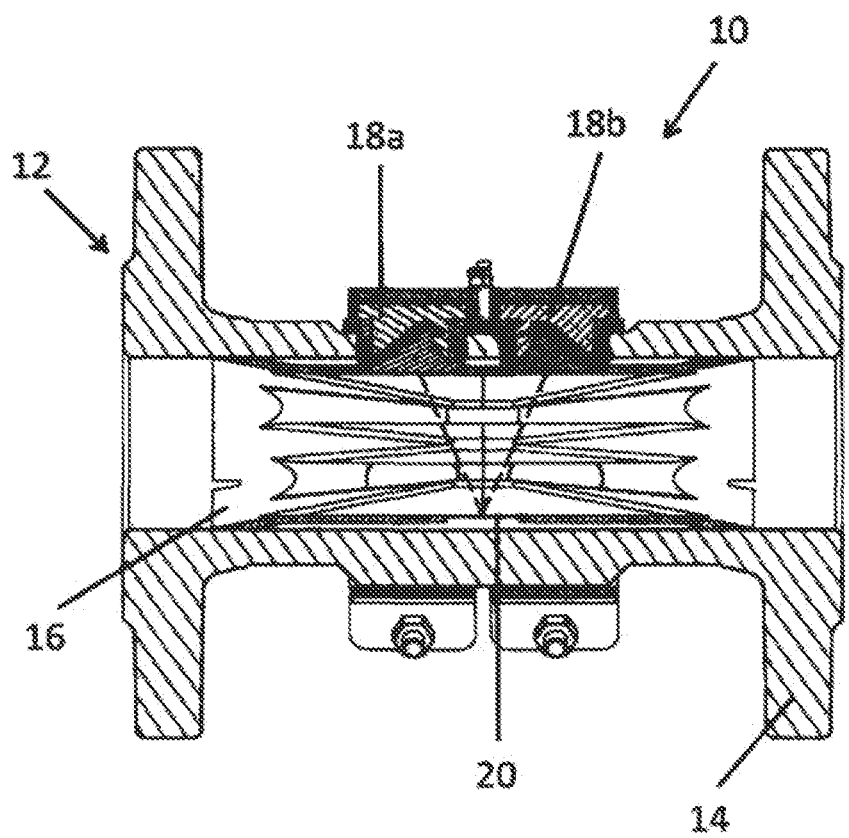
FIG. 1 shows a longitudinal section through a measuring device with built-in ultrasonic sensors and reflection elements.

Ways of carrying out the invention and industrial applicability:

FIG. 1 shows a longitudinal section through a measuring device 10 for determining the flow rate of a fluid which flows through a pipe portion with a measuring pipe 12, which has an outer pipe 14 in which an inner pipe 16 is located. Furthermore ultrasonic sensors 18a, 18b for emitting or receiving acoustic signals are provided.

A pair of ultrasonic sensors 18a, 18b comprises an ultrasonic sensor 18a for emitting acoustic signals and an ultrasonic sensor 18b for receiving acoustic signals. Three pairs of ultrasonic sensors 18a, 18b are provided, which are distributed equidistantly in the circumferential direction around the outer pipe 14, of which only one pair is shown in FIG. 1. Each individual pair of ultrasonic sensors 18a, 18b is aligned in the axial direction of the measuring pipe 12.

Reflection elements 20 for reflecting an acoustic signal are located on the inner wall of the inner pipe 16. Three reflection elements 20 are provided, which are arranged equidistantly distributed between the individual pairs of ultrasonic sensors 18a, 18b in the circumferential direction around the measuring pipe 12. Each reflection element 20 is associated with a pair of ultrasonic sensors 18a, 18b and is positioned such that the signal path from the ultrasonic sensor 18a for transmitting acoustic signals to the ultrasonic sensor 18b for receiving acoustic signals of a pair of ultrasonic sensors is V-shaped.

Figure 2:
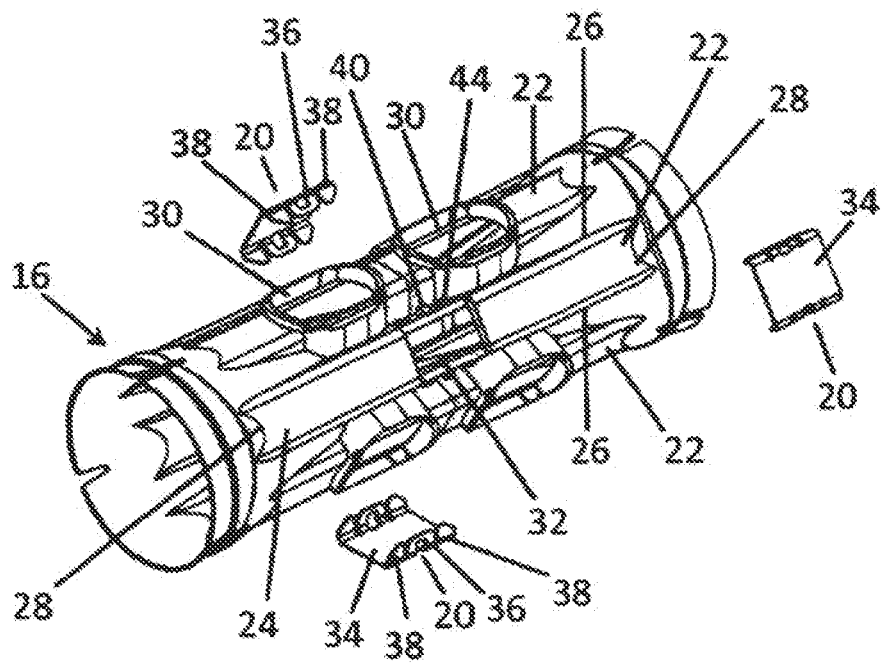
FIG. 2 shows an inner pipe of a measuring device in perspective view and reflection elements in disassembled view.

FIG. 2 shows the inner pipe 16 and three reflection elements 20 in exploded view. The inner pipe 16 has six rib-like bulges 22, each extending in the axial direction of the inner pipe 16 and distributed equidistantly along the circumference of the inner pipe 16. The rib-like bulges 22 have a planar top surface 24, two longitudinal sides 26 extending in the axial direction, and two end portions 28. The planar top surface 24 has the effect that the inner pipe 16, which is round in cross-section, has a straight wall section at least in sections. In order to obtain a stepless transition between the wall of the inner pipe 18 and the rib-like bulge 22 in the longitudinal direction of the measuring pipe 12, the height of the longitudinal side 26 continuously decreases in the direction of the respective end section 28.

On these rib-like bulges 22, receptacles 30 for the ultrasonic sensors 18a, 18b and openings 32 for the reflection elements 20 are provided, wherein a rib-like bulge 22 has either receptacles 30 for the ultrasonic sensors 18a, 18b or an opening 32 for a reflection element 20. The size and contour of the receptacles 30 or openings 32 are adapted to the size and contour of the ultrasonic sensors 18a, 18b or the reflection elements 20, so that they can be fastened to the wall of the inner pipe 16 with a precise fit.

The reflection element 20 comprises a flat plate 34, wherein a fixing eyelet 36 and two flat tabs 38 are provided on each of two opposite sides. The fixing eyelet 36 and the two flat tabs 38 are arranged at a small distance from one another, are angled with respect to the flat plate 34 and, in particular, have an angle of approximately 90°. The flat plate 34 serves as a reflection surface for the ultrasonic signal, while the fixing eyelet 36 and the two flat tabs 38 are fastening elements.

Figure 4:
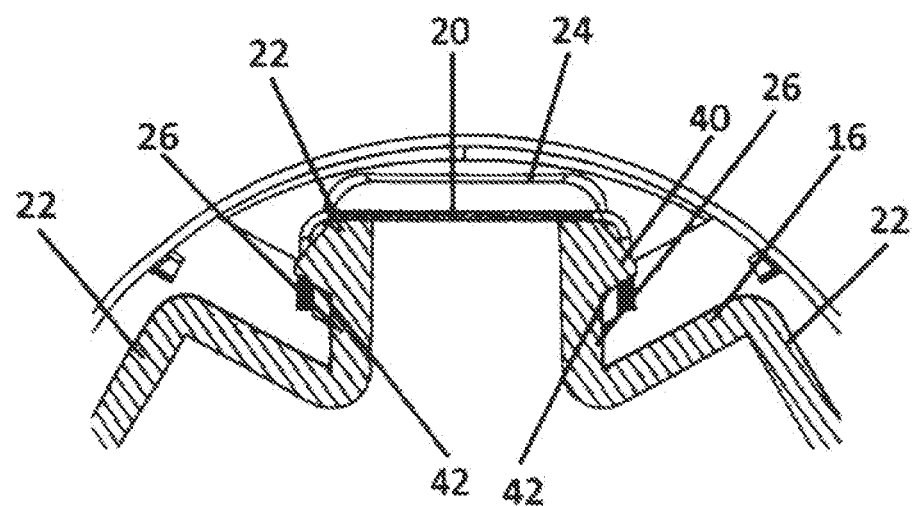
FIG. 4 shows a cross-section through an inner pipe in the area of a reflection element.

In the region of the opening 32, as can be seen in particular in FIG. 4, there are outwardly pointing latching lugs 40 on each longitudinal side 26 of the rib-like bulge 22, which serve as counter fastening elements for a fixing eyelet 36. The latching lugs 40 are each beveled on their underside 42. Furthermore, guide bars 44 (see FIG. 2) are provided on the longitudinal side of the rib-like bulge 22 in the region of the opening, the width of which corresponds to the distance between the fixing eyelet 36 and the flat tabs 38. The guide bars 44 are arranged at a distance on both sides of the latching lug 40.

Figure 3:
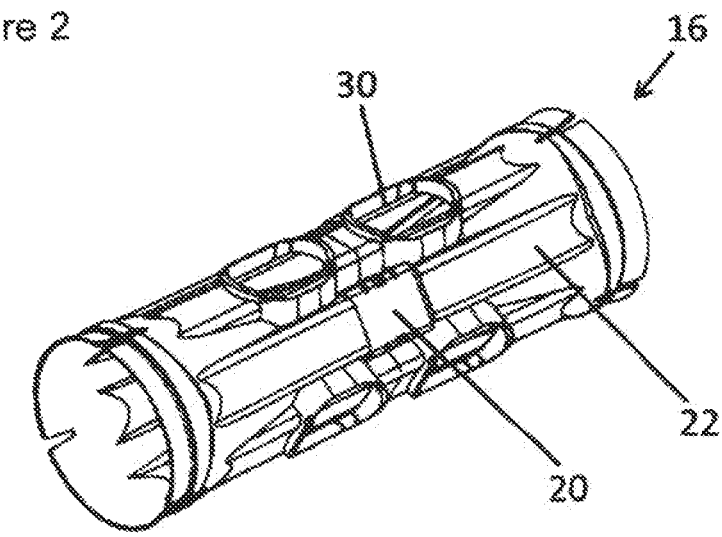
FIG. 3 shows a perspective view of an inner pipe of a measuring device with built-in reflection elements.

FIG. 3 shows the inner pipe 16 with reflection elements 20 in the assembled state. The reflection element 20 fits snugly in the corresponding opening 32 and thus completely covers the opening. As can be seen in FIG. 1, the reflection element 20 is arranged so that the reflection element 20 and the inner wall of the inner pipe 16 form a flat plate.

For mounting said reflection elements 20, they are placed over the opening 32 of the inner pipe 16. The flat tabs 38 of the reflection element 20, together with the guide bars 44 on the rib-like bulge 22, serve as positioning aids. The fixing eyelets 36 interact with the latching lug 40 to form a snap-in connection. The bevel on the underside of the latching lug 40 compensates for component tolerances of the reflection element 20.

In the embodiment shown in FIGS. 1 to 4, the inner pipe 16 has a larger diameter at its inlet or outlet than in the center of the inner pipe 16. The inner pipe 16 thus fits tightly against the inner wall of the outer pipe 14 at its inlet or outlet. In order to maintain this type of attachment of the inner pipe 16 to the outer pipe 14, the rib-like bulges 22 in the radial direction do not protrude beyond the outlet or inlet of the inner pipe.

In an embodiment not shown, the inner pipe may be omitted. In this case, the outer pipe has rib-like bulges as described in connection with the inner pipe. In this embodiment, the rib-like bulges may also protrude beyond the diameter of the outer pipe.

In the illustrated embodiment, the ultrasonic sensors 18a, 18b are positioned in openings of the outer pipe 14 and the inner pipe 16. In an embodiment not shown, the ultrasonic sensors may also be attached to the outside of the outer pipe in the manner of a clamp-on connection.

Although the invention has been illustrated in connection with three pairs of ultrasonic sensors, the invention can also be used in other measuring devices which have at least one pair of ultrasonic sensors.

It goes without saying that the features of individual embodiments may be combined with each other.

The invention claimed is:

1. A measuring device for determining the flow rate of a fluid which flows through a pipe portion, comprising:
   a measuring pipe arrangement (10) with a pipe (12),
   at least one ultrasonic sensor (18a) for transmitting an acoustic signal,
   at least one ultrasonic receiver (18b) for receiving the acoustic signal transmitted by the ultrasonic sensor,
   a reflection element (20) for reflecting the acoustic signal, wherein the wall of the pipe (12) has a through opening (32) which is covered by the reflection element (20) with the reflection element (20) being fastened to the wall of the pipe (12) in a positive-locking manner and there being a snap-in connection between the reflection element (20) and the wall of the pipe (12), wherein the reflection element (20) has fastening elements and the pipe (12) has counter fastening elements for forming the snap-in connection between the reflection element (20) and the wall of the pipe (12), wherein the counter fastening element comprises at least one latching lug (40).

2. The measuring device according to claim 1, characterized in that the reflection element (20) is fastened to the outside of the pipe (12).

3. The measuring device according to claim 1, characterized in that the reflection element (20) is aligned flush with the inner wall of the pipe (12) at least in the longitudinal direction of the pipe (12).

4. The measuring device according to claim 1, characterized in that the reflection element (20) has a flat surface (34).

5. The measuring device according to claim 1, characterized in that the at least one latching lug (40) having compensating surfaces (42).

6. The measuring device according to claim 1, characterized in that the pipe (12) is an inner pipe (16).

7. The measuring device according to claim 1, characterized in that the pipe (12) has at least one straight wall portion extending in the axial direction and/or in the circumferential direction.

8. The measuring device according to claim 7, characterized in that the reflection element (20) is fastened to the pipe (12) at the straight wall portion.

9. The measuring device according to claim 1, characterized in that the pipe (12) has at least one rib-like structure (22) in the axial direction.

10. The measuring device according to claim 1, wherein said fastening elements are fixing eyelets (36), fixing tabs (38), or combinations thereof.

* * * * *